United States Patent [19]

Thomas et al.

[11] Patent Number: 5,383,677
[45] Date of Patent: Jan. 24, 1995

[54] BICYCLE BODY SUPPORT APPARATUS

[76] Inventors: Timothy N. Thomas, 150 Garden Club Rd., Nordland, Wash. 98358; Robert P. Schladetzky, 2982 Beaver Vy Rd., Port Ludlow, Wash. 98365

[21] Appl. No.: 209,272

[22] Filed: Mar. 14, 1994

[51] Int. Cl.⁶ .............................................. B62K 19/40
[52] U.S. Cl. .................................. 280/288.4; 280/290
[58] Field of Search .............. 280/288.4, 288.1, 220, 280/290, 304.4; 297/243; 248/240, 286; 224/35, 282, 42.45 R

[56] References Cited

U.S. PATENT DOCUMENTS

| | | | |
|---|---|---|---|
| 601,530 | 3/1898 | Singleton | 280/290 |
| 1,350,987 | 8/1920 | Cherry | 224/35 X |
| 2,229,778 | 1/1941 | Taulbee | 280/290 |
| 4,650,249 | 3/1987 | Serber | 297/313 |
| 4,660,887 | 4/1987 | Fleming et al. | 297/452.54 |
| 4,919,378 | 4/1990 | Iwasaki et al. | 248/295.1 |
| 4,978,167 | 12/1990 | Harvey | 297/215.13 |
| 5,123,698 | 6/1992 | Hodges | 297/201 |
| 5,326,122 | 7/1994 | Duffy | 280/288.4 |

FOREIGN PATENT DOCUMENTS

| | | | |
|---|---|---|---|
| 0792852 | 1/1936 | France | 280/290 |
| 0008001 | of 1896 | United Kingdom | 280/290 |
| 1159826 | 6/1985 | U.S.S.R. | 280/288.4 |

*Primary Examiner*—Eric D. Culbreth
*Assistant Examiner*—F. Zeender

[57] ABSTRACT

A body support mounted to a cross tube portion of an associated bicycle includes a mounting bracket pivotally mounting a seat assembly thereto, such that the seat assembly is pivoted to a displaced position during periods of non-use relative to the mounting bracket structure, with a lock sleeve cooperatively associated with the mounting bracket and support assembly and magnetically adhered to an abutment ring relative to the seat assembly to maintain latching of the seat assembly in an operative position relative to a rider of the bicycle.

2 Claims, 3 Drawing Sheets

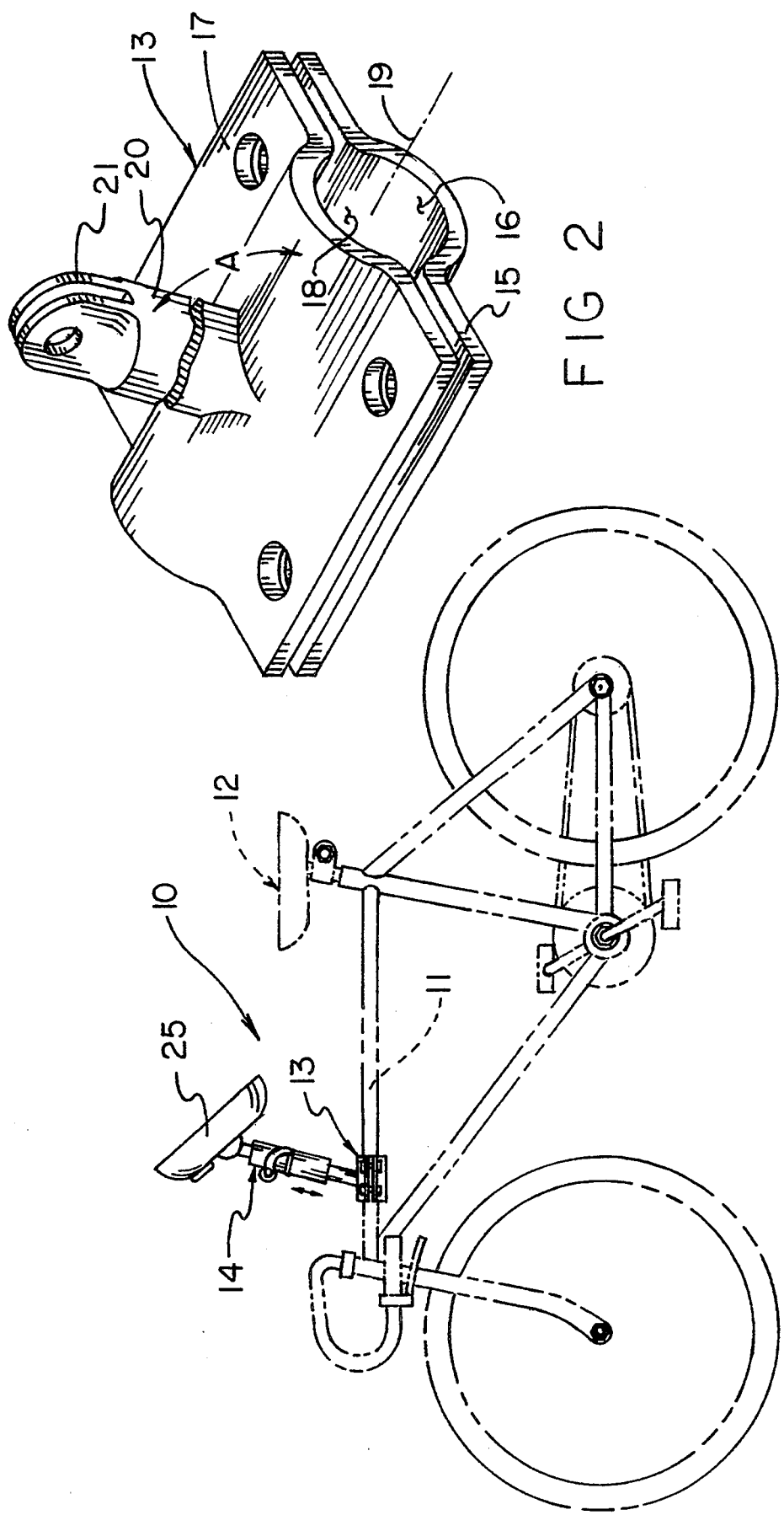

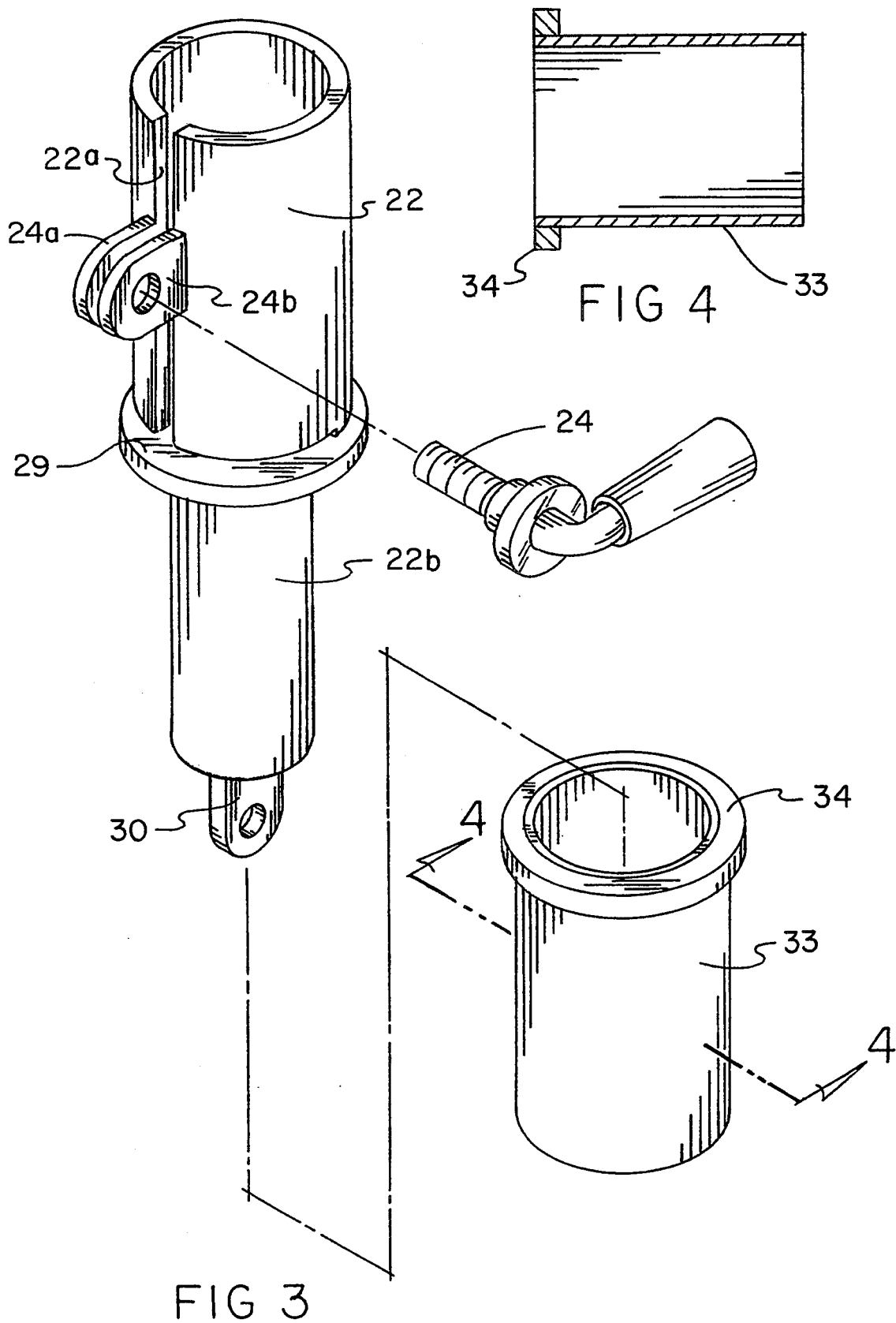

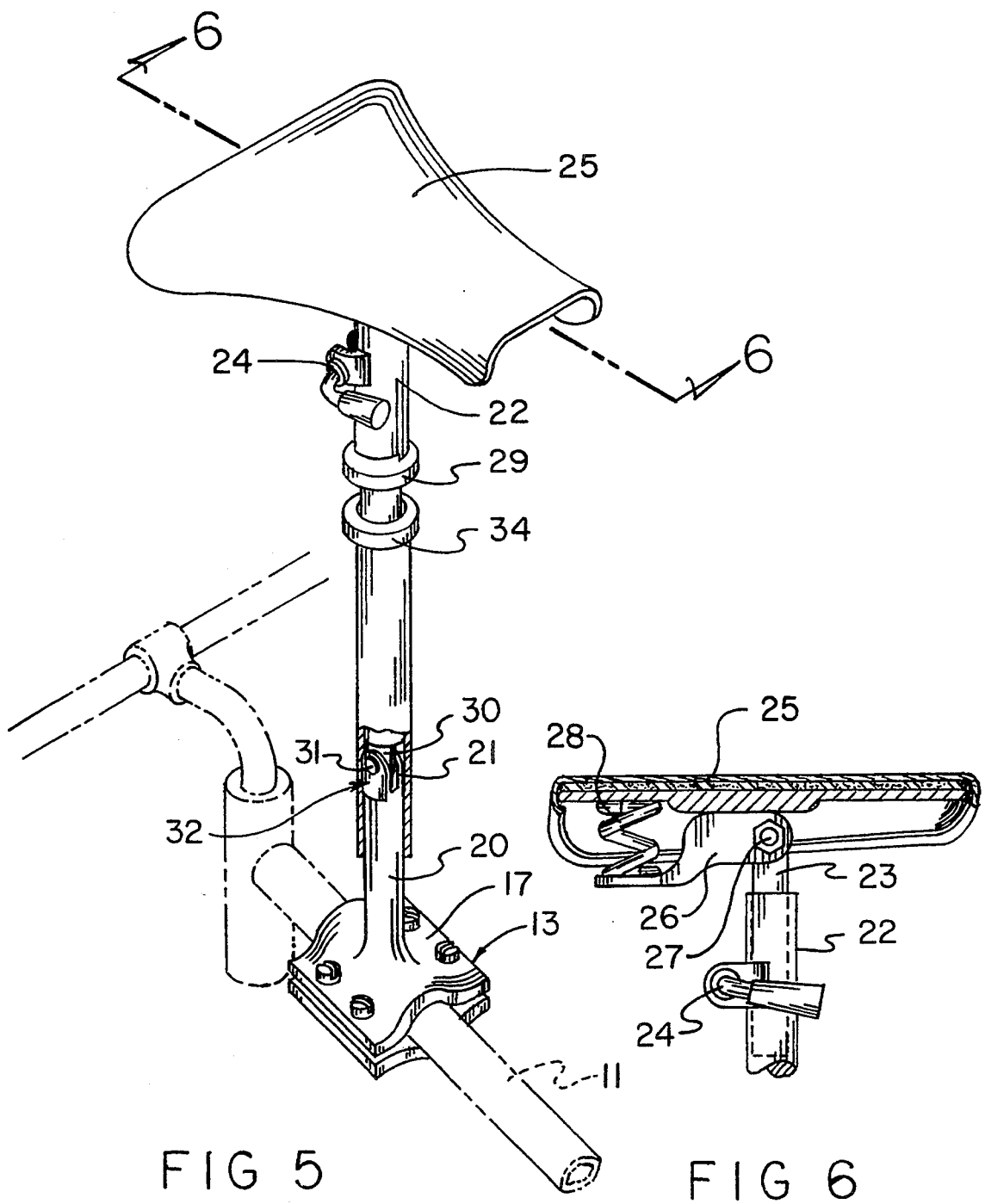

BICYCLE BODY SUPPORT APPARATUS

BACKGROUND OF THE INVENTION

1. Field of the Invention

The field of invention relates to bicycle support structure, and more particularly pertains to a new bicycle body support apparatus wherein the same is arranged for the torso support of an individual during use of a bicycle.

2. Description of the Prior Art

Bicycle support structure such as indicated in U.S. Pat. No. 4,919,378 and 4,978,167 are available in the prior art.

The instant invention attempts to overcome deficiencies of the prior art by providing for a torso support specifically oriented relative to an individual to maintain that individual's torso in a supported manner during use of the bicycle and in this respect, the present invention substantially fulfills this need.

SUMMARY OF THE INVENTION

In view of the disadvantages inherent in the known types of bicycle support apparatus now present in the prior art, the present invention provides a bicycle body support apparatus wherein the same is arranged to cant a seat structure towards an individual rider permitting the rider to rest the torso portion of the rider's body thereon.

To attain this, the present invention provides a body support mounted to a cross tube portion of an associated bicycle includes a mounting bracket pivotally mounting a seat assembly thereto, such that the seat assembly is pivoted to a displaced position during periods of non-use relative to the mounting bracket structure, with a lock sleeve cooperatively associated with the mounting bracket and support assembly and magnetically adhered to an abutment ring relative to the seat assembly to maintain latching of the seat assembly in an operative position relative to a rider of the bicycle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide a new bicycle body support apparatus which may be easily and efficiently manufactured and marketed.

It is a further object of the present invention to provide a new bicycle body support apparatus which is of a durable and reliable construction.

An even further object of the present invention is to provide a new bicycle body support apparatus which is susceptible of a low cost of manufacture with regard to both materials and labor, and which accordingly is then susceptible of low prices of sale to the consuming public, thereby making such bicycle body support apparatus economically available to the buying public.

Still yet another object of the present invention is to provide a new bicycle body support apparatus which provides in the apparatuses and methods of the prior art some of the advantages thereof, while simultaneously overcoming some of the disadvantages normally associated therewith.

Even still yet another object of the present invention is to provide a new bicycle body support apparatus mountable to a bicycle upper cross tube by a mounting bracket with the mounting bracket pivotally mounting a seat assembly thereto, such that the seat assembly is pivoted to a displaced position during periods of non-use relative to the mounting bracket structure, with a lock sleeve cooperatively associated with the mounting bracket and support assembly and magnetically adhered to an abutment ring relative to the seat assembly to maintain latching of the seat assembly in an operative position relative to a rider of the bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of the invention installed upon a bicycle.

FIG. 2 is an enlarged isometric illustration of the mounting bracket structure.

FIG. 3 is an isometric exploded illustration of the torso support assembly.

FIG. 4 is an orthographic view, taken along the lines 4—4 of FIG. 3 in the direction indicated by the arrows.

FIG. 5 is an isometric illustration of the invention.

FIG. 6 is an orthographic view, taken along the lines 6—6 of FIG. 5 in the direction indicated by the arrows.

DESCRIPTION OF THE PREFERRED EMBODIMENT

With reference now to the drawings, and in particular to FIGS. 1-6 thereof, a new bicycle body support apparatus embodying the principles and concepts of the present invention and generally designated by the reference numeral 10 will be described.

More specifically, the bicycle body support apparatus 10 of the instant invention comprises a mounting bracket 13 arranged for securement to a cross tube 11 of an associated bicycle 12, with the mounting bracket pivotally mounting a torso support assembly 14 above the cross tube. The cross tube mounting bracket 13, such as indicated in FIG. 2, includes a lowermost plate 15 having a first semi-cylindrical recess 16 arranged for securement to an uppermost plate 17 having a second semi-cylindrical recess 18, with the first and second semi-cylindrical recesses 16 and 18 being symmetrically oriented about an axis 19 that in turn is oriented coaxially and medially of the bicycle cross tube 11. As illustrated, fastener openings are directed through the lowermost and uppermost plates 15, 17 to receive fasteners, such as indicated in FIG. 1, to capture and secure the cross tube 11 between the uppermost and lowermost plate structure. A support shaft 20 is fixedly mounted to the uppermost plate 17 medially thereof and canted slightly from the vertical towards a rear of the associated bicycle 12 to define an acute included angle "A" between the support shaft 20 and the axis 19, such as illustrated in FIG. 1, for example. Preferably, the angle "A" ranges between seventy and ninety degrees from the axis 19, with the most preferred angle being eighty degrees. In this manner, proper orientation of a seat member 25 to support an individual's torso portion is availed. It should be understood that such angle "A" may vary depending upon the configuration of the bicycle 12, such as in FIG. 5, where a lady-style bicycle has the cross tube 11 canted relative to the horizontal cross tube orientation indicated in FIG. 1.

The support shaft 20 has, at a free distal end thereof, a bifurcated mount 21 arranged to pivotally receive a seat mounting tube securement flange 30 therebetween about a shaft fastener 31, as shown in FIGS. 2 and 3. The seat mounting tube securement flange 30, the shaft fastener 31, and the bifurcated mount 21 cooperate to define a pivot connection 32, such as indicated in FIG. 5. The seat mounting tube 22 includes a split cylindrical configuration spaced above a ferrous metallic abutment ring 29 with the split configuration including a gap 22a, with a seat shaft 23 being received therewithin (see FIG. 6). A clamping member 24 is threadedly received in a first clamp flange 24a and slidably received in second clamp flange 24b which are mounted on opposed sides of a gap of the split seat mounting tube 22. As most clearly shown in FIG. 6, the seat shaft 23 includes a seat member 25 mounted thereon about an axle fastener 27 directed through the seat shaft 23 and a seat member support plate 26 that may further optionally include at least one spring 28 between the seat member 25 and the support plate 26 to provide additional cushioning to the padded seat member.

To secure the seat-mounting tube 22 relative to the support shaft 20, a lock sleeve 33 is slidably mounted along the support shaft 20 and arranged for slidable reception upon the seat mounting tube lowermost portion 22b oriented between the securement flange 30 and the abutment ring 29. The lock sleeve 33 is formed with a magnetic ring 34 arranged for magnetic adherence to the ferrous metallic abutment ring 29 to support the sleeve in two positions. In a first position when the lock sleeve 33 is oriented below the pivot connection 32 between the pivot connection and the uppermost plate 17, the pivot connection is exposed and permitted to pivot, and in a second position when the lock sleeve has the magnetic ring 34 in contiguous and magnetic adherence to the abutment ring 29, the pivot connection is positioned within the lock sleeve to prevent pivoting of the torso support assembly 14 relative to the mounting bracket 13 and thereby lock the support shaft 20 relative to the seat mounting tube lowermost portion 22b in use, such as illustrated in the FIG. 1 for example.

As to the manner of usage and operation of the instant invention, the same should be apparent from the above disclosure, and accordingly no further discussion relative to the manner of usage and operation of the instant invention shall be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A bicycle body support apparatus arranged for securement to a bicycle cross tube, the apparatus comprising:

a cross tube mounting bracket having a lowermost plate arranged in facing adjacency to an uppermost plate; with the lowermost plate including a first semi-cylindrical recess to receive the cross tube therewithin, and the uppermost plate including a second semi-cylindrical recess to receive the cross tube therewithin, wherein the first semi-cylindrical recess and the second semi-cylindrical recess are symmetrically oriented about a predetermined axis;

a support shaft fixedly mounted to the uppermost plate and projecting therefrom canted relative to the predetermined axis at an acute angle, the support shaft having a mount portion at a free distal end of the support shaft;

a torso support assembly arranged for mounting to the mount portion, wherein the torso support assembly includes a seat mounting tube having a split cylindrical configuration with a gap extending longitudinally therethrough;

a first clamp flange and second clamp flange mounted on opposed sides of the gap;

a clamping member threadably engaged to said first flange and slidably positioned through said second flange; a seat shaft received within the seat mounting tube and secured within the seat mounting tube by the clamping member, the seat mounting tube having a seat mounting tube lowermost portion coaxially aligned therewith;

a ferrous metallic abutment ring oriented between the seat mounting tube and the seat mounting tube lowermost portion, with the seat lowermost portion including a securement flange arranged for reception within the mount portion of the support shaft; and, a shaft fastener securing the mount portion to the securement flange, with the securement flange, the shaft fastener, and the mount portion defining a pivot connection between the torso support assembly and the cross tube mounting bracket.

2. An apparatus as set forth in claim 1, further including a lock sleeve, the lock sleeve slidably directed about the support shaft and the seat mounting tube lowermost portion, with the lock sleeve having a magnetic ring arranged for magnetic adherence to the ferrous metallic abutment ring, with the lock sleeve being positional in a first position between the pivot connection and the uppermost plate spaced from the pivot connection, and a second position with the magnetic ring magnetically adhered to the abutment ring, with the lock sleeve receiving the pivot connection therewithin.

* * * * *